United States Patent
Foda

(10) Patent No.: US 12,315,065 B2
(45) Date of Patent: May 27, 2025

(54) COMPUTER SYSTEM AND METHOD FOR 3D SCENE GENERATION

(71) Applicant: Acer Incorporated, New Taipei (TW)

(72) Inventor: Mohammad Foda, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 208 days.

(21) Appl. No.: 18/147,073

(22) Filed: Dec. 28, 2022

(65) Prior Publication Data

US 2024/0221276 A1    Jul. 4, 2024

(51) Int. Cl.
G06T 15/00     (2011.01)
G06T 7/593     (2017.01)

(52) U.S. Cl.
CPC ............ *G06T 15/005* (2013.01); *G06T 7/593* (2017.01); *G06T 2207/10012* (2013.01)

(58) Field of Classification Search
None
See application file for complete search history.

(56) References Cited

U.S. PATENT DOCUMENTS

| | | | |
|---|---|---|---|
| 10,241,329 B2 | 3/2019 | Perreault et al. | |
| 10,951,875 B2 | 3/2021 | Wetzstein et al. | |
| 2011/0228051 A1* | 9/2011 | Dedeoglu | H04N 13/128 348/51 |
| 2019/0018236 A1* | 1/2019 | Perreault | G02B 27/0172 |

FOREIGN PATENT DOCUMENTS

| | | |
|---|---|---|
| CN | 115243025 A | 10/2022 |
| TW | 202014876 A | 4/2020 |

OTHER PUBLICATIONS

Extended European Search Report dated Aug. 22, 2023, issued in application No. EP 23150499.4.
Shibata, T., et al.; "Visual discomfort with stereo displays;" Feb. 2011; pp. 1-9.
Shibata, T., et al.; "The zone of comfort;" NIH Public Access; Jul. 2011; pp. 1-53.
Rogmans, S., et al.; "Biological-aware stereoscopic rendering in free viewpoint technology using GPU computing;" IEEE; Jun. 2010; pp. 1-4.
Chinese language office action dated Apr. 8, 2024, issued in application No. TW 112122556.

* cited by examiner

*Primary Examiner* — David H Chu
(74) *Attorney, Agent, or Firm* — McClure, Qualey & Rodack, LLP

(57) ABSTRACT

A method for three-dimensional (3D) scene generation is provided. The method includes the step of obtaining the first convergence parameter from a configuration file that corresponds to the application program. The method further includes the step of extracting depth information from function calls sent from the application program to the graphics driver, and determining the minimum depth based on the depth information. The method further includes the step of calculating the second convergence parameter based on the first convergence parameter and the minimum depth. The method further includes the step of modifying the function calls to apply the second convergence parameter. The method further includes the step of converting the modified function calls into rendering instructions and sending the rendering instructions to the GPU, by running the graphics driver. The method further includes the step of generating an image pair according to the rendering instructions.

10 Claims, 9 Drawing Sheets

COMPUTER SYSTEM AND METHOD FOR 3D SCENE GENERATION

BACKGROUND OF THE INVENTION

Field of the Invention

The present disclosure relates in general to image processing techniques, and it relates in particular to three-dimensional (3D) scene generation.

Description of the Related Art

As the eyes are in different positions on the head, they present different views simultaneously. The principle of stereoscopic 3D imaging is to make the right and left eyes see slightly different images, so that the brain exploits the parallax due to the different views from the eye to gain depth perception and estimate distance. Parallax brings depth perception, yet too much parallax may lead to the effect of vergence accommodation conflict (VAC), which can cause discomfort such as visual fatigue and eye strain, or even daze some viewers who are not used to 3D visualization effects. Therefore, it is crucial to control the amount of parallax in stereoscopic 3D imaging for 3D visual applications.

In 3D scenes, the convergence value and the vertex depth are two key factors that affect the amount of parallax. The vertex depth is given by the application program, depending on the image content that the application program is designed to present to a viewer's eyes, so it varies from application program to application program, and from scene to scene. Thus, a fixed convergence value, as well as a static range of convergence values, fail to accommodate to the variable vertex depth for various application programs and various scenes. When an object comes too close to the virtual eyes (or virtual cameras) in a virtual 3D space, excessive parallax will be produced. Excessive parallax may cause the viewer's eyes see two excessively separated images instead of one stereoscopic object popping out, and have difficulties converging them.

Therefore, it is desirable to have a solution for 3D scene generation that is capable of controlling the parallax and ensuring it remains at an appropriate level regardless of how close objects come from scene to scene.

BRIEF SUMMARY OF THE INVENTION

An embodiment of the present disclosure provides a computer system for three-dimensional (3D) scene generation. The computer system includes a processing unit and a graphics processing unit (GPU). The processing unit runs an application program. The GPU is coupled to the processing unit, and is configured to generate an image pair according to rendering instructions sent from the processing unit. The processing unit is further configured to obtain the first convergence parameter from a configuration file that corresponds to the application program. The processing unit is further configured to extract depth information from function calls sent from the application program to the graphics driver, and to determine the minimum depth based on the depth information. The processing unit is further configured to calculate the second convergence parameter based on the first convergence parameter and the minimum depth. The processing unit is further configured to modify the function calls to apply the second convergence parameter. The processing unit is further configured to convert the modified function calls into rendering instructions and to send the rendering instructions to the GPU, by running the graphics driver.

In an embodiment, the processing unit is further configured to determine whether the minimum depth is smaller than the first convergence parameter. In response to the minimum depth being smaller than the first convergence parameter, the processing unit is further configured to calculate the second convergence parameter by adding a fraction of the minimum depth to the minimum depth. In response to the minimum depth not being smaller than the first convergence parameter, the processing unit is further configured to calculate the second convergence parameter by adding the fraction of the minimum depth to the first convergence parameter.

In an embodiment, the processing unit is further configured to calculate the fraction of the minimum depth based on the interpupillary distance and the screen width.

In an embodiment, the GPU is further configured to generate a stereoscopic image based on the image pair, and to send the stereoscopic image to an autostereoscopic display device to display the stereoscopic image. In another embodiment, the GPU is further configured to send the image pair to a wearable device that includes a pair of display panels for displaying the image pair.

An embodiment of the present disclosure provides a method for three-dimensional (3D) scene generation. The method is carried out by a computer system running an application program. The method includes the step of obtaining the first convergence parameter from a configuration file that corresponds to the application program. The method further includes the step of extracting depth information from function calls sent from the application program to the graphics driver, and determining the minimum depth based on the depth information. The method further includes the step of calculating the second convergence parameter based on the first convergence parameter and the minimum depth. The method further includes the step of modifying the function calls to apply the second convergence parameter. The method further includes the step of converting the modified function calls into rendering instructions and sending the rendering instructions to the GPU, by running the graphics driver. The method further includes the step of generating an image pair according to the rendering instructions.

By adapting the convergence value to the vertex depth of the object in the virtual 3D space, the computer system and method for 3D scene generation provided by embodiments of the present disclosure are capable of controlling the parallax to remain at an appropriate level regardless of how close objects come from scene to scene. Thus, the effect of vergence accommodation conflict (VAC) caused by excessive parallax can be avoided.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE INVENTION

Figure 1A:
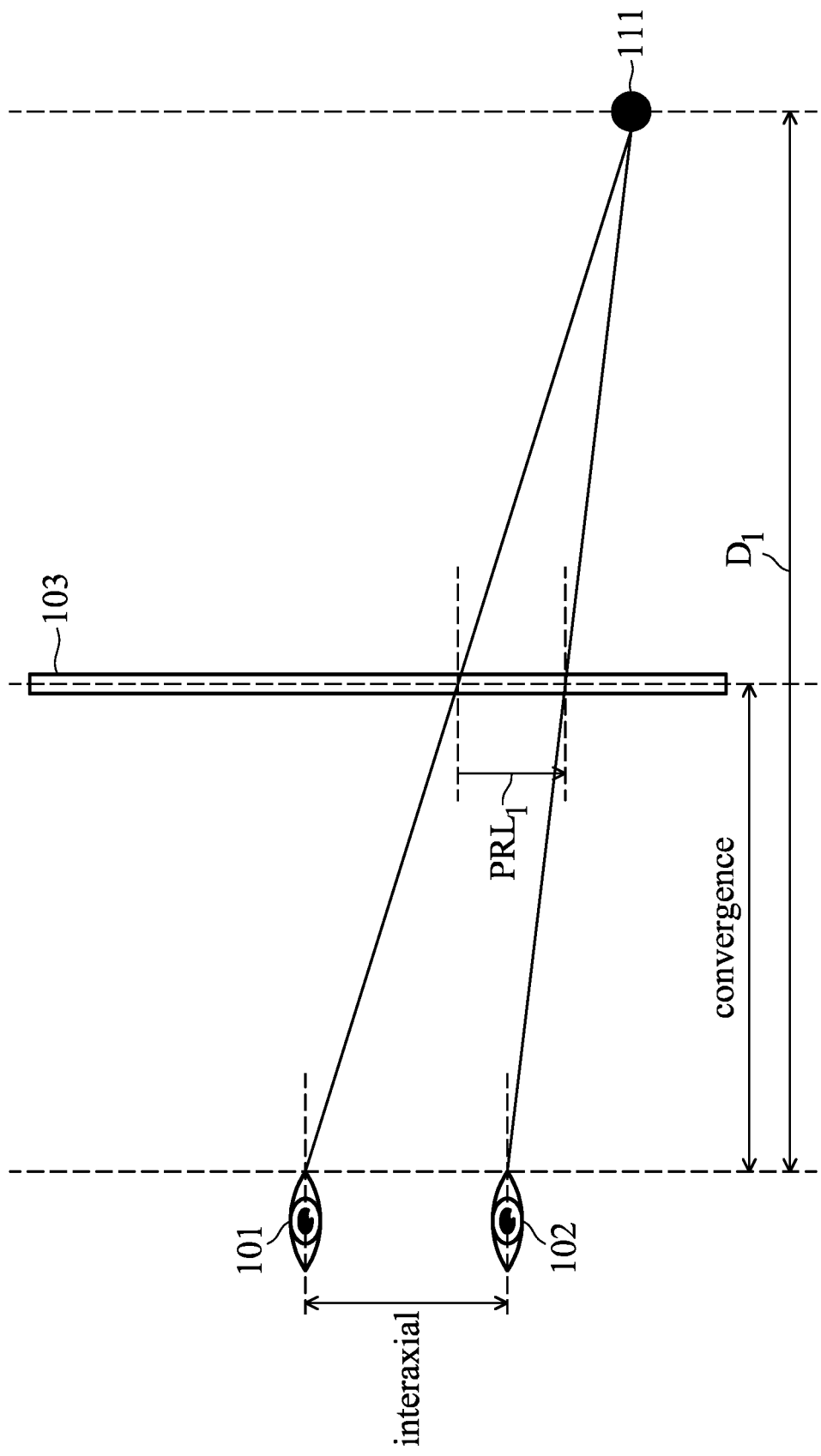
FIG. 1A illustrates the side view of an exemplary virtual 3D space.

The following description is made for the purpose of illustrating the general principles of the invention and should not be taken in a limiting sense. The scope of the invention is best determined by reference to the appended claims.

In each of the following embodiments, the same reference numbers represent identical or similar elements or components.

It must be understood that the terms "including" and "comprising" are used in the specification to indicate the existence of specific technical features, numerical values, method steps, process operations, elements and/or components, but do not exclude additional technical features, numerical values, method steps, process operations, elements, components, or any combination of the above.

Ordinal terms used in the claims, such as "first," "second," "third," etc., are only for convenience of explanation, and do not imply any precedence relation between one another.

First, the physical meaning of some technical terms used in the present disclosure will be briefly introduced.

The term "viewing frustum" is the field of view of a virtual camera system that aims at controlling a set of virtual cameras to define the scenes in a virtual 3D space. Simply put, the viewing frustum can be regarded as the field of view of a virtual camera or a virtual eye in the virtual 3D space. The viewer will perceive the field of view of the virtual camera or the virtual eye as the real view.

The term "virtual screen" refers to a plane at which the left and right viewing frustums converge in a virtual 3D space. The viewer will perceive the virtual screen as the real screen of the real world. In some embodiments, the width of the virtual screen is regarded as equivalent to the width of the real screen in the real world.

In some literatures in the field of ophthalmology, the term "convergence" refers to the simultaneous inward movement of both eyes towards each other, usually in an effort to maintain single binocular vision when viewing an object. In the field of stereoscopic 3D imaging and in the present disclosure, however, the term "convergence value" or "convergence parameter" refers to the perceived depth of the virtual screen.

The term "parallax" refers to the signed distance on the virtual screen between the projected positions of one vertex (or pixel) in the left and right images. The brain exploits the parallax due to the different views from the eye to gain depth perception and estimate distances to objects.

The term "vertex depth" refers to the perceived depth of a vertex (or pixel) in the virtual 3D space. The vertex depth is given by the application program, depending on the image content that the application program is designed to present to viewer's eyes, so it varies from application program to application program and from image content to image content. For example, the first application program is designed to provide a vast grassland as the virtual 3D space, while the second application program is designed to provide an indoor room as the virtual 3D space. As the scenes that the first application program and the second application program are designed to present to viewer's eyes are different, the vertex depths of the objects given by the first application program and the second application programs are also different. As the objects in the scenes moves, the vertex depth of the objects will also change. For example, when an eagle in the virtual vast grassland scene provided by the first application program flies toward the viewer's eyes, the vertex depth of the eagle will decrease.

The term "interaxial value" refers to the distance between the two virtual eyes (or virtual cameras) in the virtual 3D space. In some embodiments, the interaxial value is regarded as equivalent to the interpupillary distance (IPD), the distance between the centers of the pupils of the eyes in the real world.

FIG. 1A illustrates the side view of an exemplary virtual 3D space. As previously described, the distance between the virtual left eye 101 and the virtual right eye 102 is the interaxial value, and the perceived depth of the virtual screen 103 is the convergence value. As shown in FIG. 1A, the sight lines of the virtual left eye 101 and the virtual right eye 102 are aiming at a vertex 111, and the perceived depth of the vertex 111 is $D_1$. The vertex depth $D_1$ is greater than the convergence value, indicating that the vertex 111 is perceived to be behind the virtual screen 103. Meanwhile, there is a distance between the two intersections of the sight lines and the virtual screen 103, namely the parallax $PRL_1$. By definition, the parallax $PRL_1$ is a positive parallax since the vertex 111 is perceived to be behind the virtual screen 103.

Figure 1B:
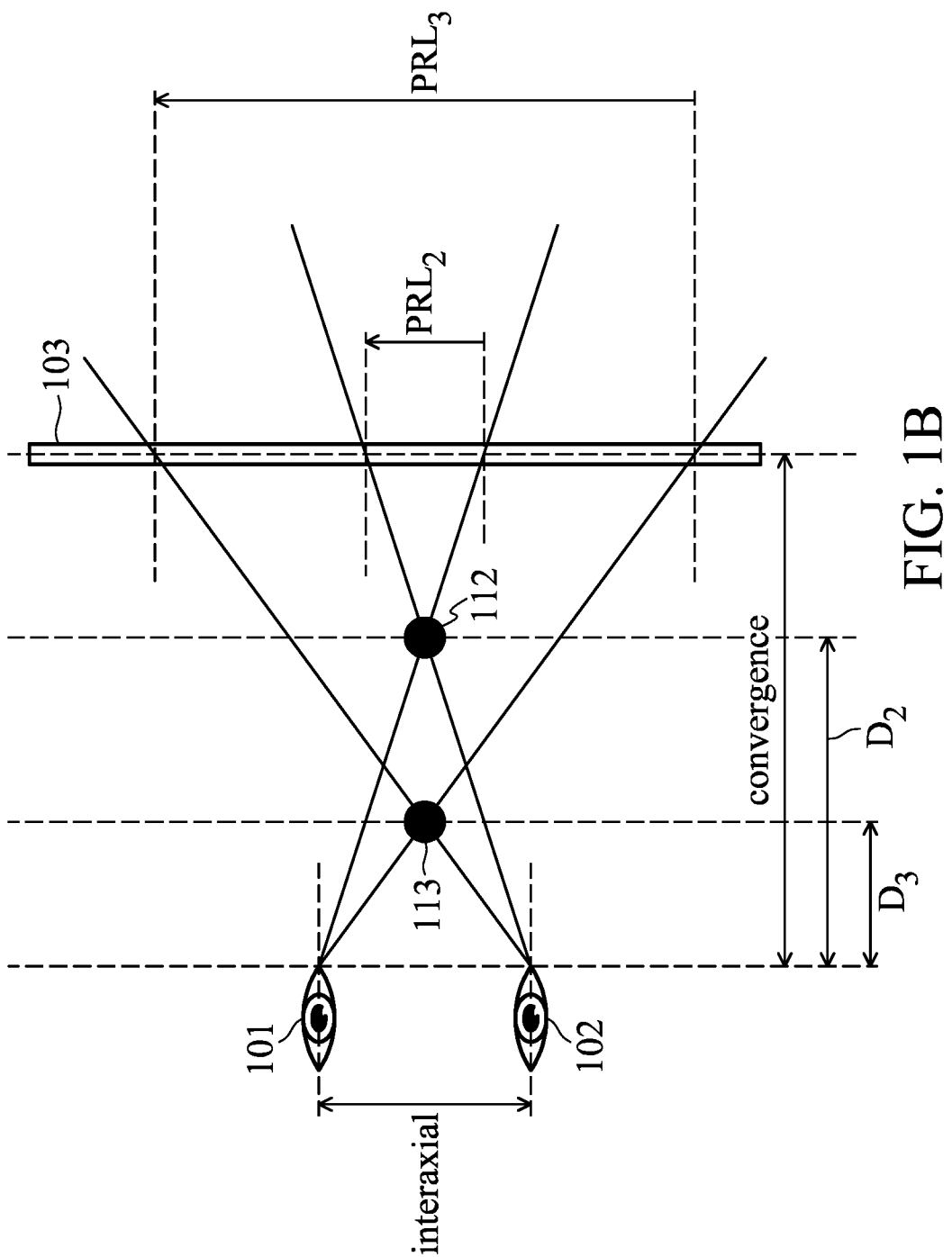
FIG. 1B illustrates the side view of another exemplary virtual 3D space.

FIG. 1B illustrates the side view of another exemplary virtual 3D space. As shown in FIG. 1B, the sight lines of the virtual left eye 101 and the virtual right eye 102 are aiming at a vertex 112 and a vertex 113, and the perceived depths of the vertex 112 and vertex 113 are $D_2$ and $D_3$, respectively. The vertex depths $D_2$ and $D_3$ are both smaller than the convergence value, indicating that both the vertex 112 and the vertex 113 are perceived to be in front of the virtual screen 103. Meanwhile, the vertex depths $D_2$ and $D_3$ correspond to the parallaxes $PRL_2$ and $PRL_3$, respectively. By definition, the parallaxes $PRL_2$ and $PRL_3$ are negative parallaxes since the vertex 112 and the vertex 113 are perceived to be in front of the virtual screen 103.

As can be seen in FIG. 1B, the vertex depth $D_3$ is smaller than the vertex depth $D_2$, indicating that the vertex 113 is perceived to be even closer to the eyes, compared to the vertex 112. Meanwhile, the parallax $PRL_3$ (absolute value) corresponding to the vertex depth $D_3$ is greater than the $PRL_2$ (absolute value) corresponding to the vertex depth $D_2$. This shows that when an object in the 3D scene pops out of the screen and approaches to the viewer's eyes, the parallax will widen.

As a matter of fact, parallax is a function of the convergence value and the vertex depth. The parallax function can be mathematically expressed by <Formula I> as follows:

$$\text{parallax} = \text{separation value} \times \left(1 - \frac{\text{convergence value}}{\text{vertex depth}}\right) \quad \text{〈Formula I〉}$$

In <Formula I>, the term "separation value" indicates the normalized value of the interaxial value by the virtual screen width (i.e., the width of the virtual screen 103). Therefore, the separation value can be mathematically expressed by <Formula II> as follows:

$$\text{separation value} = \frac{\text{interaxial}}{\text{virtual screen width}} \quad \text{〈Formula II〉}$$

Figure 2:
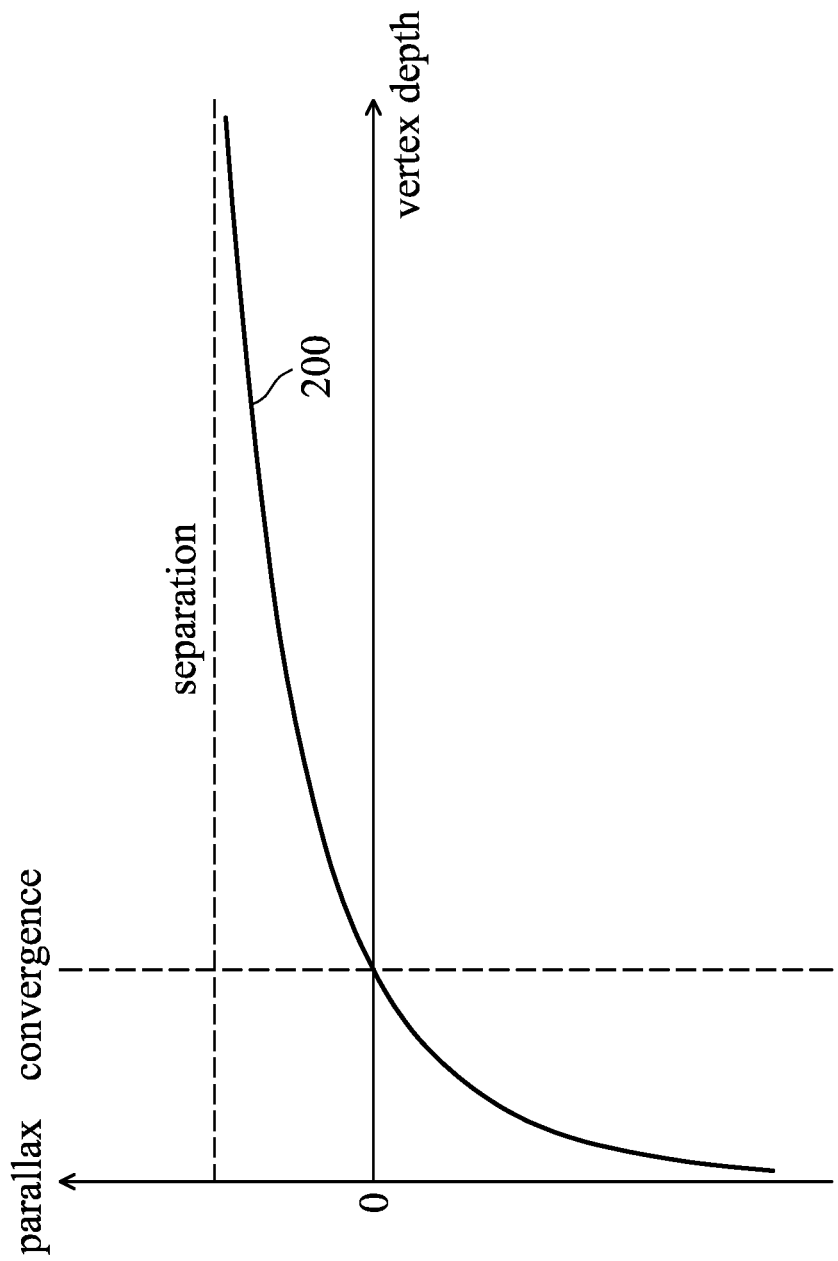
FIG. 2 illustrates an exemplary parallax curve of the parallax function.

FIG. 2 illustrates an exemplary parallax curve 200 of the parallax function. As can be seen in FIG. 2, parallax increases as the vertex depth increase, and it converges to the separation value when the vertex depth approaches to infinity. When the vertex depth equals to the convergence value, there will be no parallax (i.e., parallax is zero), and the viewer will perceive the nearest object to be on the screen. If the nearest object pops out of the screen and approaches to the viewer's eyes, the parallax will diverge quickly to negative infinity as the vertex depth decreases. As previously mentioned, excessive (negative) parallax may lead to the effect of vergence accommodation conflict (VAC), which the present disclosure aims to avoid.

Next, implementation of the various aspects of the present disclosure will be described.

Figure 3A:
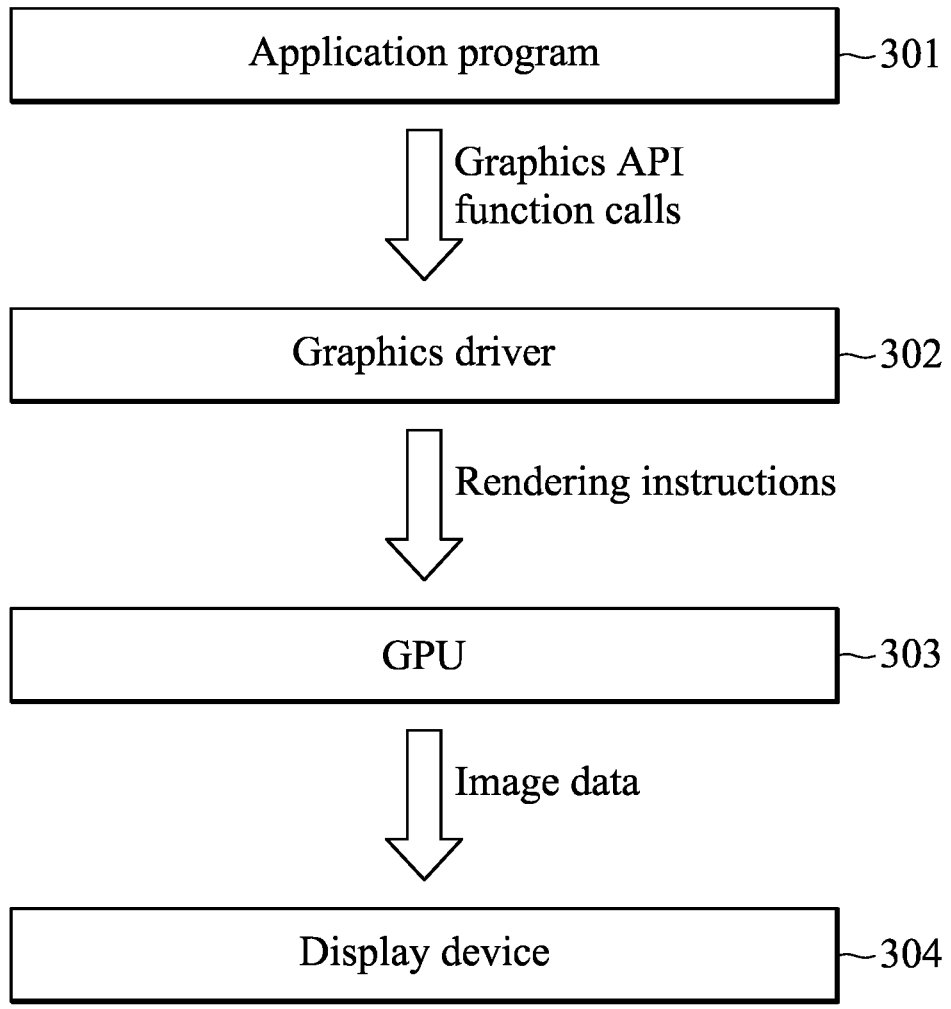
FIG. 3A is a schematic block diagram illustrating the conventional flow of generating and displaying scenes for an application program by a computer system.

FIG. 3A is a schematic block diagram illustrating the conventional flow of generating and displaying scenes for an application program by a computer system. As shown in FIG. 3A, it is required to go through a graphics driver layer (i.e., graphics driver 302) and a graphics processing unit (GPU) layer (i.e., GPU 303) for the scenes of the application program 301 to be eventually displayed on the display device 304.

The application program 301 may be any software program providing visualized images or scenes to viewers, such as a game, a video/multimedia player program, a photo viewing program, or other visual entertainment applications.

The GPU 303 is a specialized electronic circuit designed to execute computer graphics computing and image processing, for offloading the general-purpose central processing unit (CPU). The GPU 303 is thus more efficient than the general-purpose CPU for computer graphics computing and image processing.

The graphics driver 302 is a set of software programs allowing the operating system (e.g., Windows, Linux, MacOS, etc.), on which the application program 301 is installed, to communicate with the GPU 303.

The display device 304 may be any device for displaying visualized information, such as liquid-crystal display (LCD), light-emitting diode (LED) display, organic light-emitting diode (OLED) display, plasma display, etc. In 3D display or virtual reality (VR) scenarios, the display device 304 can be an autostereoscopic display device, or a wearable device such as 3D/VR glasses and headgears.

During execution, the application program 301 sends function calls to the graphics driver 302, in order to request the GPU to render the image of the application program 301. The called functions are typically provided by a graphics application interface (API), such as DirectX (for Microsoft Windows), OpenGL (cross-platform), Glide (cross-platform), Metal (for MacOS or iOS), Vulkan (cross-platform), etc. In response to receiving the function calls, the graphics driver 302 converts them into lower-level rendering instructions that are comprehensible for the GPU 303, and then sends the rendering instructions to the GPU 303. In response to receiving the rendering instructions from the graphics driver 302, the GPU 303 renders images according to the rendering instructions. Finally, the rendered images are sent to the display device 304 to display the scene.

Figure 3B:
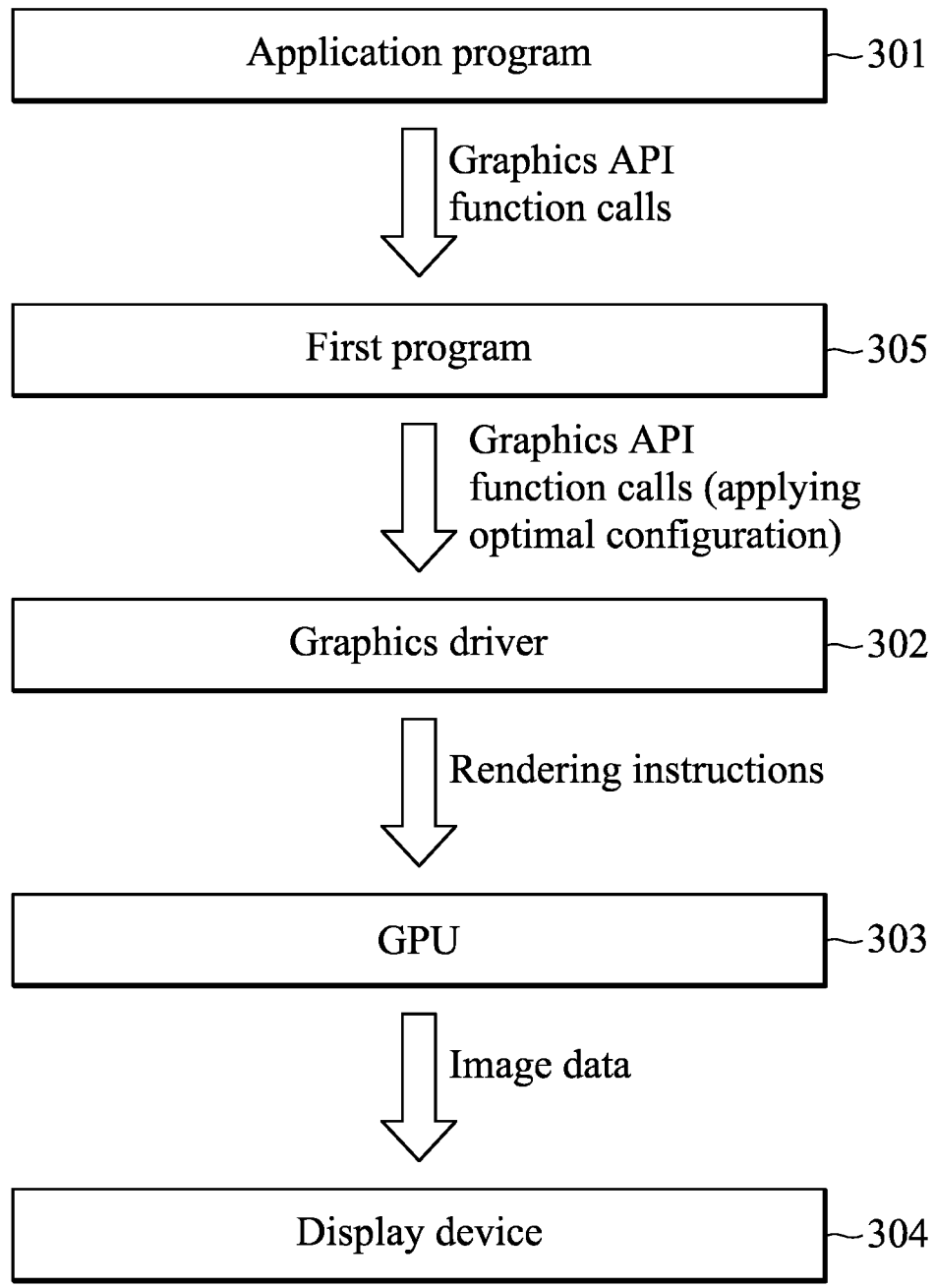
FIG. 3B is a schematic block diagram illustrating the flow of generating and displaying scenes for an application program by a computer system.

FIG. 3B is a schematic block diagram illustrating the flow of generating and displaying scenes for an application program by a computer system, according to an embodiment of the present disclosure. The difference between FIG. 3A and FIG. 3B is that there is an additional layer, the first program 305, between the application program 301 and the graphics driver 302.

The first program 305 is designed for intercepting the function calls sent from the application program 301, inserting additional logic for the function calls to apply optimal configuration (i.e., parameter settings) for the application program, and transmitting the function calls with the inserted logic to the graphics driver 302. In an embodiment, the insertion of the additional logic can be carried out by allocating memory in the address space of the process of the application program 301 to store additional codes in a dynamic-link library (DLL). There are multiple alternative ways, however, to implement the insertion of the additional logic. The present disclosure is not limited to the implementations of the insertion of the additional logic. The instructions sent from the graphics driver 302 to the GPU 303 are converted from the function calls with inserted logic, instead of the original function calls sent from the application program 301. Therefore, even if the application program requests the GPU to render the image using the default or predefined parameters, the GPU may eventually render the image of the application program 301 with the optimal parameter settings instead as the first program 305 requested.

Figure 4:
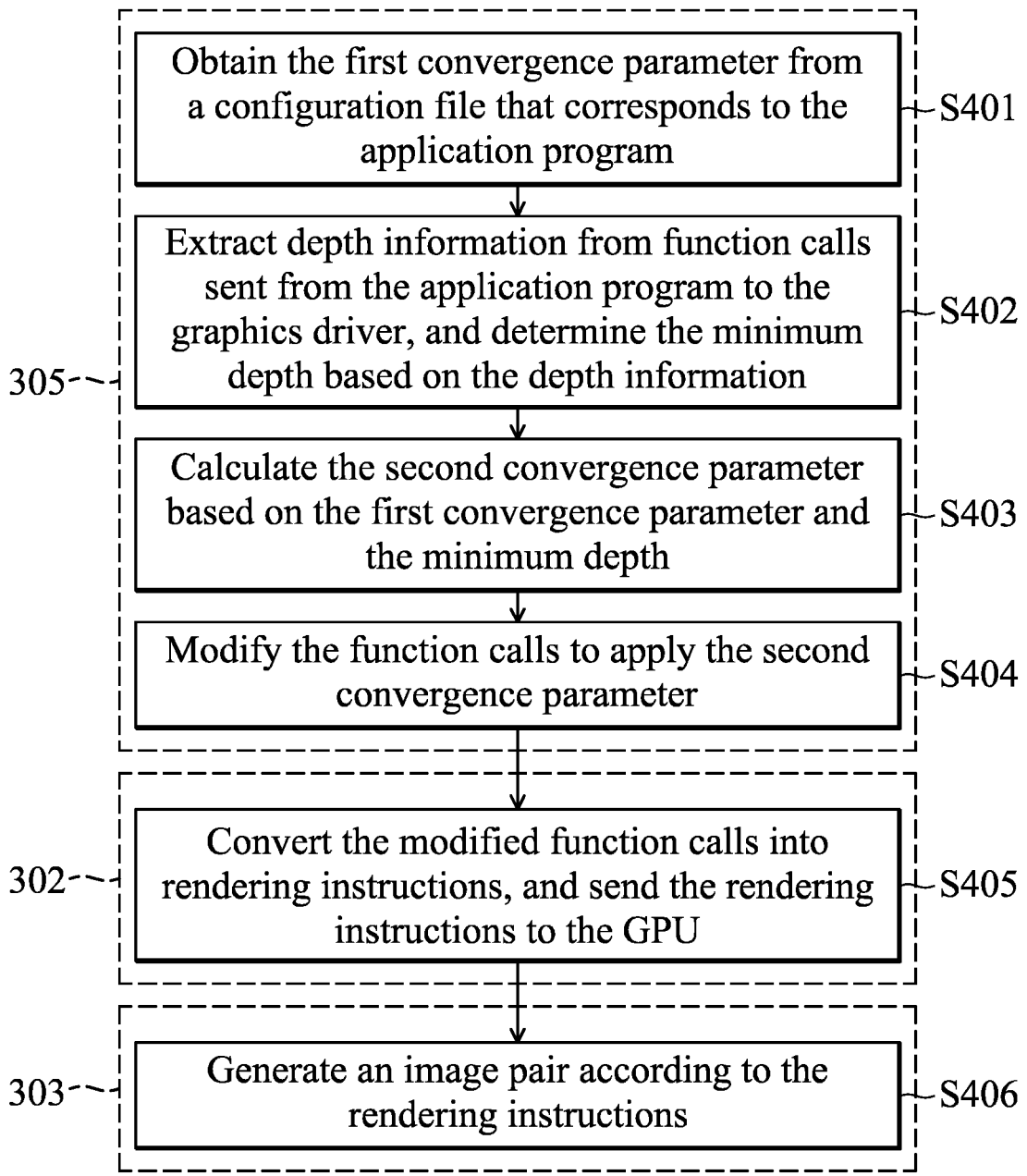
FIG. 4 is the flow diagram illustrating the method for 3D scene generation, according to an embodiment of the present disclosure.

Next, the method for 3D scene generation provided by the present disclosure will be introduced with reference to FIG. 4.

FIG. 4 is the flow diagram illustrating the method 400 for 3D scene generation, according to an embodiment of the present disclosure. The method 400 may be executed by a computer system. As shown in FIG. 4, the method 200 includes steps S401-S406, in which steps S401-S404 may be executed by the processing unit of the computer system by running the first program 305, step S405 may be executed by the processing unit of the computer system by running the graphics driver 302, and step S406 may be executed by the GPU 303 of the computer system.

In step S401, the first convergence parameter is obtained from a configuration file that corresponds to the application program 301. Then, the method 400 proceeds to step S402.

The content recorded in the configuration file varies from application program to application program. In an embodiment, the configuration file can be the original configuration file provided by the developer, used for recording a set of original (or default) parameter settings of the application program. In another embodiment, the configuration file is used for recording a set of parameter settings of the application program which has been optimized for the stereoscopic 3D mode. The set of optimized parameters can be determined by the developer of the first program 105 based on their experience and test result, but the present disclosure is not limited thereto. Who optimizes the set of parameter settings, and how the set of parameter settings are optimized are both not limited by the present disclosure. The file extension name of the original configuration file can be ".ini", ".cfg", ".conf", ".txt", etc. The file format of the original configuration file is not limited by the present disclosure.

In step S402, depth information is extracted from function calls sent from the application program 301 to a graphics driver 302, and the minimum depth is determined based on the depth information. Then, the method 400 proceeds to step S403.

The depth information relates to the perceived depth of the surfaces of objects in the virtual 3D space. The depth information can be represented in the form of a depth map or a point cloud, the present disclosure is not limited thereto. The minimum depth is the perceived depth of the nearest vertex (or pixel) on the nearest object.

In step S403, the second convergence parameter is calculated based on the first convergence parameter and the minimum depth. Thus, the second convergence parameter accommodates to the variation of minimum depth. Then, the method 400 proceeds to step S404.

In step S404, the function calls are modified to apply the second convergence parameter that accommodates to the variation of minimum depth, instead of the first convergence parameter in the configuration file. Then, the method 400 proceeds to step S405.

In step S405, the modified function calls are converted into rendering instructions and the rendering instructions are sent to the GPU. Then, the method 400 proceeds to step S406.

In step S406, an image pair (i.e., image for the left eye and image for the right eye) is generated according to the rendering instructions.

Figure 5:
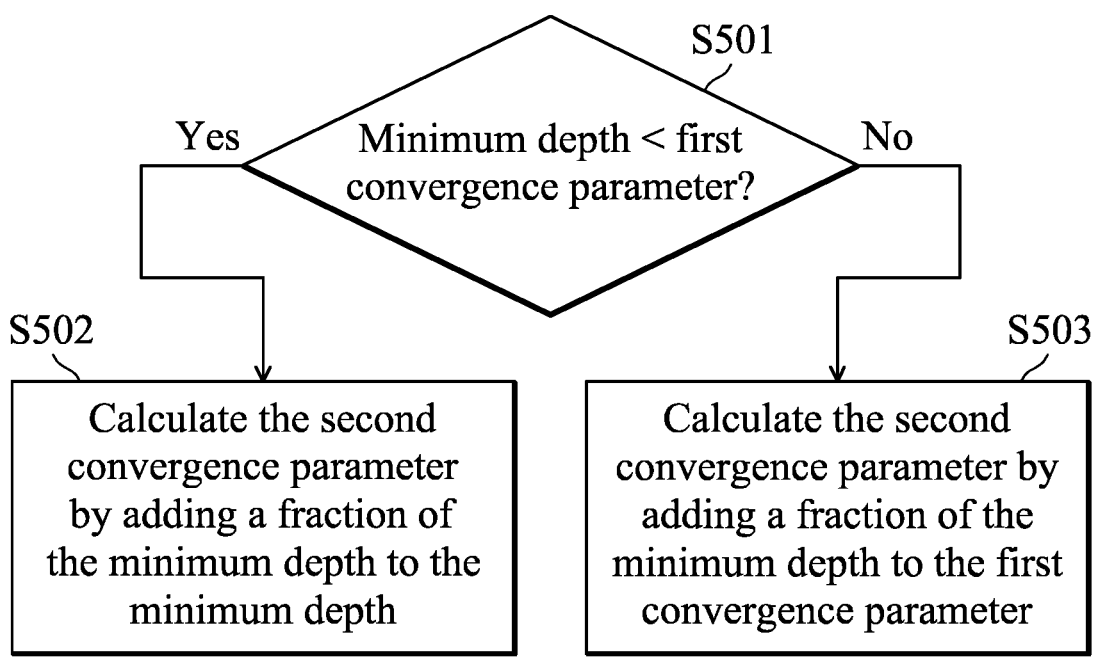
FIG. 5 is the flow diagram illustrating more detailed steps of the calculation of the second convergence parameter.

FIG. 5 is the flow diagram illustrating more detailed steps of the step S403 in FIG. 4, according to an embodiment of the present disclosure. As shown in FIG. 5, step S403 may further include steps S501-S503.

In step S501, it is determined whether the minimum depth is smaller than the first convergence parameter. If the minimum depth is smaller than the first convergence parameter, indicating that the nearest object is perceived in front of the screen, then step S502 is proceeded to. If the minimum depth is not smaller than the first convergence parameter, indicating that the nearest object is perceived step S503 is proceeded to.

In step S502, the second convergence parameter is calculated by adding a fraction of the minimum depth to the minimum depth.

In step S503, the second convergence parameter is calculated by adding the fraction of the minimum depth to the first convergence parameter.

The calculation of the second convergence parameter in steps S501-S503 can be mathematically expressed by <Formula III> as follows:

$$2^{nd} \text{ convergence parameter} = \text{Min}(\text{min\_depth}, 1^{st} \text{ convergence parameter}) + \alpha \times \text{min\_depth} \quad \text{(Formula III)}$$

In <Formula III>, min_depth indicates the minimum depth, and α×min_depth indicates the fraction of the minimum depth, where α is the scale coefficient of the minimum depth.

In an embodiment, the fraction of the minimum depth is calculated based on the separation value. As previously described <Formula II>, the separation value equals to interaxial value divided by virtual screen width. Additionally, the interaxial value can be regarded as equivalent to the interpupillary distance (IPD), and the width of the virtual screen can be regarded as equivalent to the width of the real screen in the real world. Therefore, the fraction of the minimum depth can be calculated based on the IPD and the screen width of the real screen in the real world.

In an embodiment, the calculation of the fraction of the minimum depth can be mathematically expressed by <Formula IV> as follows:

$$\alpha \times \text{min\_depth} = \frac{\text{min\_depth} \times \text{popout\_bias}}{\text{separation value}} = \quad \text{(Formula IV)}$$

$$\frac{\text{min\_depth} \times \text{popout\_bias} \times \text{screen\_width}}{\text{IPD}}$$

In <Formula IV>, α×min_depth indicates the fraction of the minimum depth, popout_bias is a predefined parameter that is typically set as a constant value (alternatively it can scale by screen width, the present disclosure is not limited thereto), and screen_width is the screen width of the real screen in the real world. The IPD used in <Formula IV> can be adjustable for viewers when the application program is running, or can be the average IPD of humans (e.g., 64 millimeters).

For example, the screen width of a 27-inch monitor is approximately 64 centimeters, and the average IPD of humans is approximately 64 millimeters, so the separation value will be approximately 0.1. Supposed the popout_bias parameter is predefined as equal to 0.05, then the value of the scale coefficient α equals to 0.5. Thus, the fraction of the minimum depth is approximately half of the minimum depth. Further assuming that the minimum depth is smaller than the first convergence parameter, it can be derived from <Formula III> that the second convergence parameter equals to 1.5 times the minimum depth. Then, it can be derived from <Formula I> that the parallax will be 0.1×(1−1.5)=−0.05. As a result, when the nearest object pops out of the screen and approaches to the viewer's eyes, the parallax will remain constant at −0.05, instead of diverging quickly to negative infinity as depicted in FIG. 2. Thus, the effect of vergence accommodation conflict (VAC) caused by excessive parallax is avoided.

Figure 6:
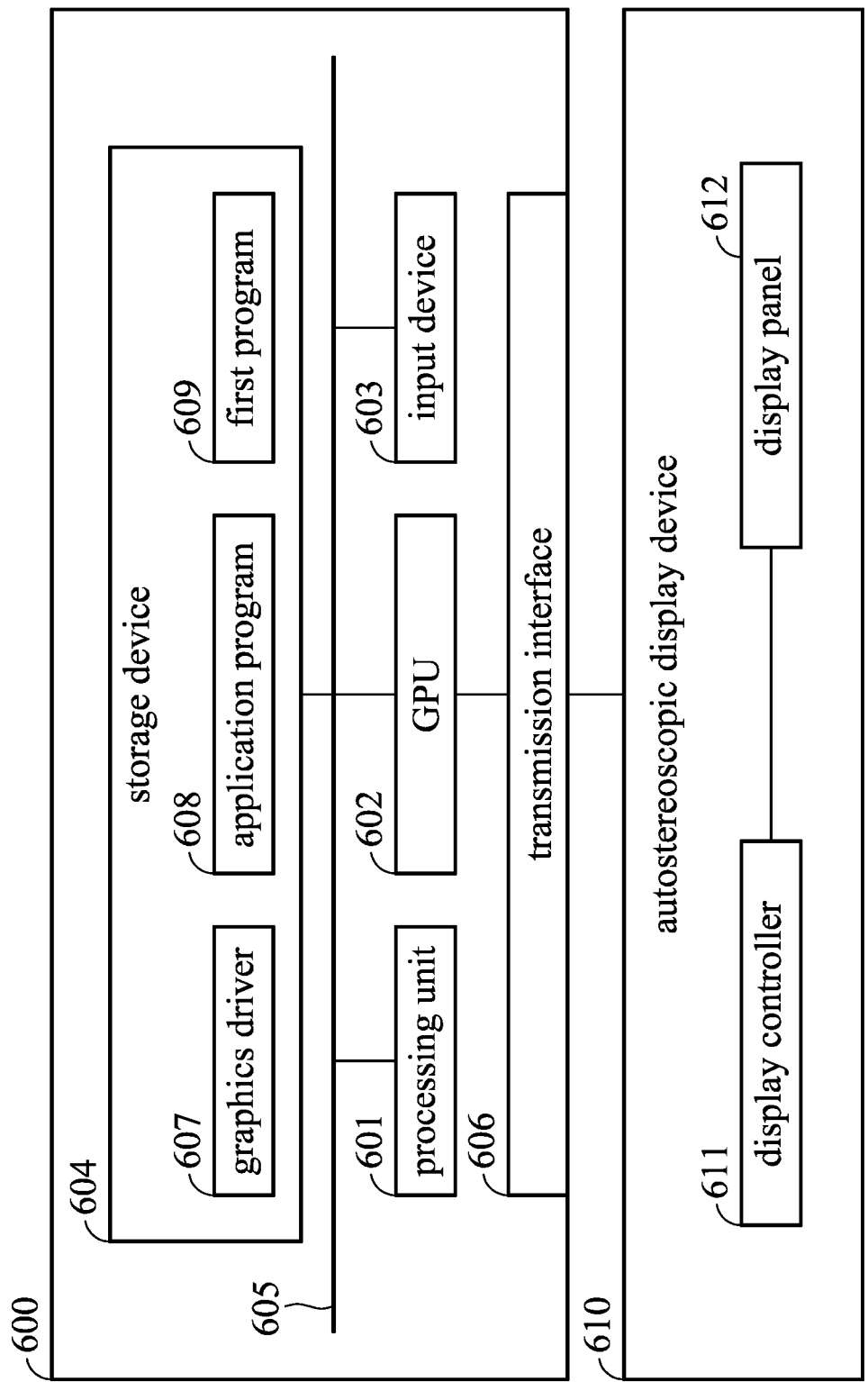
FIG. 6 is a schematic block diagram illustrating a scenario of 3D scene generation and display in which the display device is an autostereoscopic display device, according to an embodiment of the present disclosure.

FIG. 6 is a schematic block diagram illustrating a scenario of 3D scene generation and display in which the display device is an autostereoscopic display device, according to an embodiment of the present disclosure. As shown in FIG. 6, elements such as the processing unit 601, the GPU 602, the input device 603, and the storage device 604 are included in the computer system 600, and they are coupled to each other through the system bus 605.

The computer system 600 is an electronic device capable of the execution of computational tasks, such as a personal computer (including desktop computer, laptop computer, and tablet computer), or a server computer.

The processing unit 601 may be, for example, a central processing unit (CPU), a general-purpose processor, or the like, but the present disclosure is not limited thereto. The processing unit 601 is configured to run the graphics driver 607 and the application program 608 stored in the storage device 604. According to the embodiments of the present disclosure, the processing unit 601 is further configured to run the first program 609 stored in the storage device 604 to execute steps S401-S404 of the method 400 in FIG. 4.

The GPU 602 may be, for example, a specialized electronic circuit in a display card (not shown in FIG. 6) or integrated into the processing unit 601. According to the embodiments of the present disclosure, the GPU 602 is configured to execute step S406 of the method 400 in FIG. 4.

The input device 603 may include any device that is able to receive control commands from viewers, such as a keyboard, a mouse, and a touch panel, but the present disclosure is not limited thereto. In an embodiment, the input device 103 allows the viewer to adjust (increase or decrease) the IPD settings.

The storage device 604 is a non-volatile memory device, such as a hard disk drive, a solid-state disk, a flash memory, or a read-only memory, but the present disclosure is not limited thereto. According to the embodiments of the present disclosure, the storage device 604 is used for storing the graphics driver 607, the application program 608, and the first program 609.

The graphics driver 607, the application program 608, and the first program 609 are respectively identical or similar to the graphics driver 302, the application program 301, and the first program 305 in FIG. 3B, which have been described above and thus the descriptions are not repeated herein.

In the exemplary scenario of FIG. 6, since the display device is the autostereoscopic display device 610 which presents both the left eye image and the right eye image on the same screen, the GPU 602 is further configured to execute an interlacing (or weaving) process to generate a stereoscopic image based on the image pair. After generating the stereoscopic image, the GPU 602 sends the stereoscopic image to the autostereoscopic display device 610 through the transmission interface 606.

The transmission interface 606 may include wired transmission interfaces and/or wireless transmission interfaces. The wired transmission interfaces may include High Definition Multimedia Interface (HDMI), DisplayPort (DP) interface, embedded display Port (eDP) interface, Universal Serial Bus (USB) interface, USB Type-C interface, Thunderbolt interface, Digital Video Interface (DVI), or the combination thereof. The wireless transmission interface may include fifth generation (5G) wireless system, Bluetooth, WiFi, Near Field Communication (NFC) interface, etc., but the present disclosure is not limited thereto.

The autostereoscopic display device 610 is a display device capable of displaying stereoscopic images without the use of a wearable device (such as 3D/VR glasses or headgear) for the viewer. The autostereoscopic display device 610 may include a display controller 611 and a display panel 612. The display controller 611 is used for switching the display modes (e.g., the 2D mode and 3D mode that are allowed for viewers to switch between) of the display panel 612 according to the display mode control signal from the computer system 600. The display panel 612 can achieve the effect of autostereoscopic vision using any suitable autostereoscopic technology in the field of the present disclosure, such as parallax barrier, lenticular lenses, directional backlight, integral imaging, etc., the details of which will not be elaborated here. Thereby, a 3D scene of the application program can be presented to the viewer by displaying the stereoscopic image on the display panel, in response to the stereoscopic image being received by the autostereoscopic display device 610.

Figure 7:
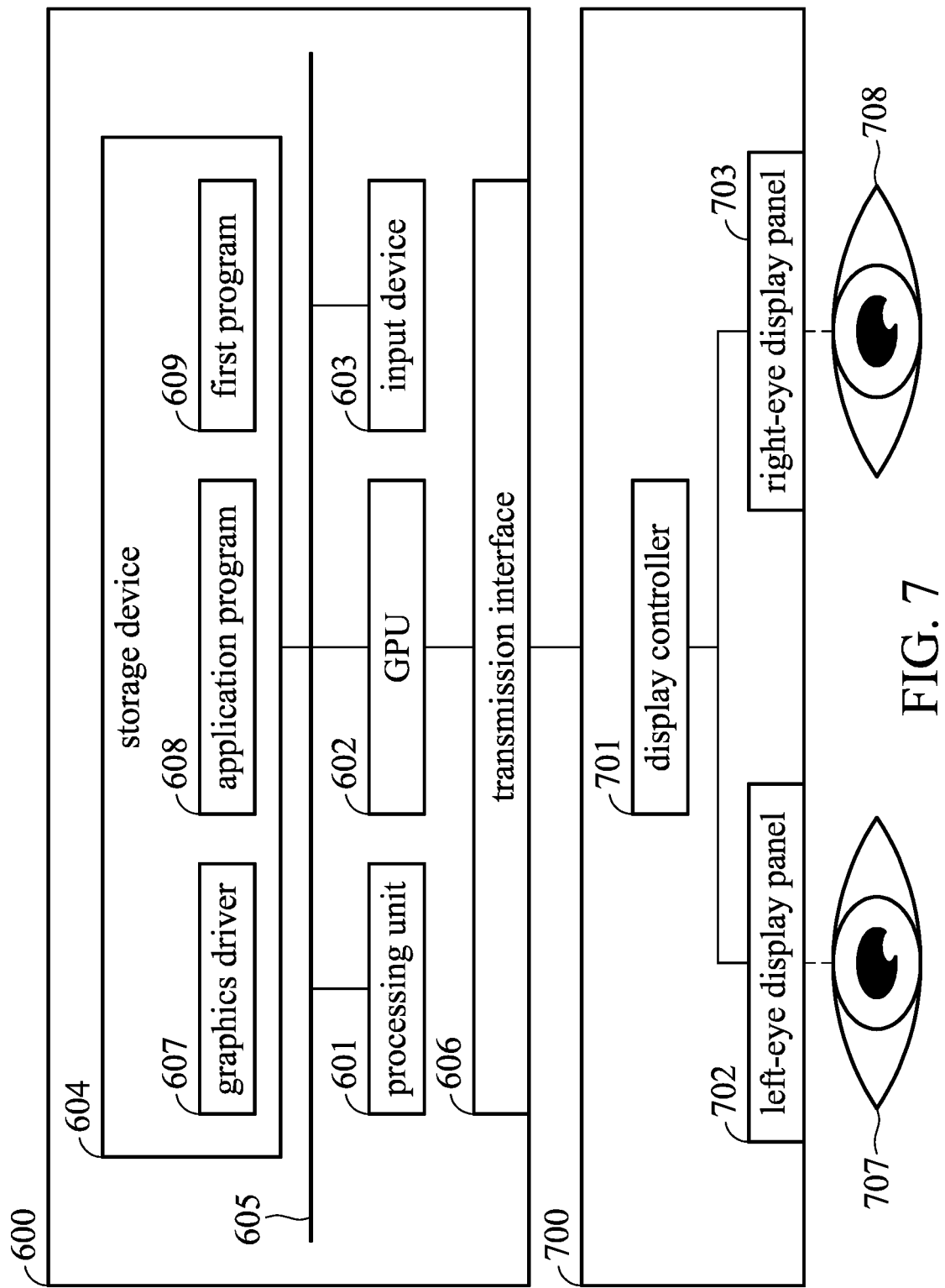
FIG. 7 is a schematic block diagram illustrating a scenario of 3D scene generation and display in which the display device is a wearable device, according to another embodiment of the present disclosure.

FIG. 7 is a schematic block diagram illustrating a scenario of 3D scene generation and display in which the display device is a wearable device (such as 3D/VR glasses or headgear), according to another embodiment of the present disclosure. The structure of the computer system 600 in FIG. 7 is substantially identical to the structure of the computer system 600 in FIG. 6, except that the GPU 602 in FIG. 7 directly sends the first image for the left eye 707 and the second image for the right eye 708 (or the first image for the right eye 708 and the second image for the left eye 707) to the wearable device 700 without executing the interlacing process. As shown in FIG. 7, the wearable device 700 may include the display controller 701, the left-eye display panel 702, and the right-eye display panel 703.

The display controller 701 can be, for example, an application-specific integrated circuit (ASIC), a system-on-chip (SoC), a processor, or a microcontroller, but the present disclosure is not limited thereto.

The left-eye display panel 702 and the right-eye display panel 703 can be, for example, a liquid crystal panel, a light-emitting diode panel, an organic light-emitting diode panel, etc., but the present disclosure is not limited thereto. In some embodiments, the left-eye display panel 702 and the right-eye display panel 703 may be different and separate display panels, or implemented by different parts (e.g., left part and right part) of the same display panel. The left-eye display panel 702 and the right-eye display panel 703 can be side-by-side and parallel. Alternatively, the left-eye display panel 702 and the right-eye display panel 703 can be side-by-side but not parallel, and there is an angular difference between the two.

The first image and the second image are alternately played on the left-eye display panel 702 and the right-eye display panel 703. For example, when playing the first image on the left-eye display panel 702, the right eye 708 of the viewer will be obscured. When playing the second image on the right-eye display panel 703, the left eye 707 of the viewer will be obscured. The viewer's vision system automatically form a stereoscopic vision by combining the images received by the two eyes at successive time. Thanks to the persistence of vision, as long as the frequency of the left eye image and the right eye image being replaced is fast enough, the viewer will not notice that the scene in front of the eye is obscured at certain time.

To sum up, by adapting the convergence value to the vertex depth of the object in the virtual 3D space, the computer system and method for 3D scene generation provided by embodiments of the present disclosure are capable of controlling the parallax to remain at an appropriate level regardless of how close objects come from scene to scene. Thus, the effect of vergence accommodation conflict (VAC) caused by excessive parallax can be avoided.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer system for three-dimensional (3D) scene generation, comprising:
 a processing unit, running an application program; and
 a graphics processing unit (GPU), coupled to the processing unit, and configured to generate an image pair according to rendering instructions sent from the processing unit;
 wherein the processing unit is further configured to execute the following operations:
 obtaining a first convergence parameter from a configuration file that corresponds to the application program;

intercepting function calls sent from the application program to a graphics driver, extracting depth information from the intercepted function calls, and determining minimum depth based on the depth information;

calculating a second convergence parameter based on the first convergence parameter and the minimum depth;

modifying the function calls to apply the second convergence parameter instead of the first convergence parameter; and converting the modified function calls into rendering instructions and sending the rendering instructions to the GPU, by running the graphics driver.

2. The computer system as claimed in claim 1, wherein the processing unit is further configured to execute the following operations:

determining whether the minimum depth is smaller than the first convergence parameter;

in response to the minimum depth being smaller than the first convergence parameter, calculating the second convergence parameter by adding a fraction of the minimum depth to the minimum depth; and in response to the minimum depth not being smaller than the first convergence parameter, calculating the second convergence parameter by adding the fraction of the minimum depth to the first convergence parameter.

3. The computer system as claimed in claim 2, wherein the processing unit is further configured to calculate the fraction of the minimum depth based on interpupillary distance and screen width.

4. The computer system as claimed in claim 1, wherein the GPU is further configured to generate a stereoscopic image based on the image pair, and to send the stereoscopic image to an autostereoscopic display device to display the stereoscopic image.

5. The computer system as claimed in claim 1, wherein the GPU is further configured to send the image pair to a wearable device that includes a pair of display panels for displaying the image pair.

6. A method for three-dimensional (3D) scene generation, carried out by a computer system running an application program, the method comprising obtaining a first convergence parameter from a configuration file that corresponds to the application program;

intercepting function calls sent from the application program to a graphics driver, extracting depth information from the intercepted function calls, and determining minimum depth based on the depth information;

calculating a second convergence parameter based on the first convergence parameter and the minimum depth;

modifying the function calls to apply the second convergence parameter instead of the first convergence parameter; and converting the modified function calls into rendering instructions and sending the rendering instructions to the GPU, by running the graphics driver; and generating an image pair according to the rendering instructions.

7. The method as claimed in claim 6, wherein the step of calculating the second convergence parameter based on the first convergence parameter and the minimum depth comprises:

determining whether the minimum depth is smaller than the first convergence parameter;

in response to the minimum depth being smaller than the first convergence parameter, calculating the second convergence parameter by adding a fraction of the minimum depth to the minimum depth; and in response to the minimum depth not being smaller than the first convergence parameter, calculating the second convergence parameter by adding the fraction of the minimum depth to the first convergence parameter.

8. The method as claimed in claim 7, wherein the step of calculating the second convergence parameter based on the first convergence parameter and the minimum depth comprises:

calculating the fraction of the minimum depth based on interpupillary distance and screen width.

9. The method as claimed in claim 6, further comprising:

generating a stereoscopic image based on the image pair, and sending the stereoscopic image to an autostereoscopic display device to display the stereoscopic image.

10. The method as claimed in claim 6, further comprising:

sending the image pair to a wearable device including a pair of display panels for displaying the image pair.

\* \* \* \* \*